United States Patent [19]
Kienscherf

[11] 3,970,916
[45] July 20, 1976

[54] CIRCUIT ARRANGEMENT FOR PRODUCING AN ALTERNATING VOLTAGE

[75] Inventor: Eckhard Kienscherf, Wedel, Holstein, Germany

[73] Assignee: Licentia Patent-Verwaltungs-G.m.b.H., Frankfurt am Main, Germany

[22] Filed: May 16, 1975

[21] Appl. No.: 578,253

[30] Foreign Application Priority Data
May 16, 1974  Germany............................ 2423718

[52] U.S. Cl................................. 321/27 R; 321/2
[51] Int. Cl.$^2$...................... H02M 7/00; H02M 5/45
[58] Field of Search............ 321/2, 9 A, 27 R, 45 R, 321/DIG. 1

[56] References Cited
UNITED STATES PATENTS

| | | | |
|---|---|---|---|
| 3,032,697 | 5/1962 | Kirk | 321/2 X |
| 3,346,794 | 10/1967 | Stemmler | 321/9 A |
| 3,391,327 | 7/1968 | Pelly | 321/27 R |
| 3,402,342 | 9/1968 | Wagner | 321/2 X |
| 3,440,566 | 4/1969 | Swanson | 321/9 A |
| 3,467,850 | 9/1969 | Christiansen et al. | 321/27 R |

*Primary Examiner*—William M. Shoop
*Attorney, Agent, or Firm*—Spencer & Kaye

[57] ABSTRACT

Circuit arrangement for producing an alternating output voltage from a d.c. input voltage employing two d.c. to a.c. voltage converters, i.e., inverter circuits, which are controlled by high frequency pulse width modulated signals so that one of the inverter circuits produces the positive half waves of the alternating output voltage and the other inverter circuit produces the negative half waves of the alternating output voltage. The outputs of the two voltage inverter circuits are connected in series across a common load and controlled electronic power switches are provided to short-circuit the output of the respective inverter circuit during the time period when it is not producing output energy.

10 Claims, 10 Drawing Figures

3,970,916

CIRCUIT ARRANGEMENT FOR PRODUCING AN ALTERNATING VOLTAGE

BACKGROUND OF THE INVENTION

The present invention relates to a circuit arrangement for producing an alternating voltage with the use of two voltage converters.

It is known to use a series of inverter circuits for the production of sinusoidal alternating voltages. In a known circuit arrangement, initially a direct voltage of the magnitude of the peak value of the desired alternating voltage is produced. In a subsequent inverter stage provided in the form of a bridge connection, transistor switches are controlled by pulse width modulated signals of as high a frequency as possible. This type of inverter circuit has the drawback that the direct voltage converter required to process low input voltages, and such input voltages are present in most cases, considerably increases the costs and complexity of the circuit. This reduces the efficiency of the circuit considerably.

In a further known inverter circuit a rectangular or stepped alternating voltage is produced first. The harmonic content of the voltage signal can be reduced by filters. However, the transformers and filters must be dimensioned to be able to handle the relatively low operating frequency and are therefore heavy and voluminous. Neither such an inverter circuit nor the circuit mentioned above can be used in spacecraft where all supply elements must be relatively compact and lightweight for reasons of space and weight requirements.

SUMMARY OF THE INVENTION

It is the object of the present invention to provide a circuit arrangement for producing an alternating voltage which covers an energy range of from a few watts to several kilowatts, is very efficient and is relatively lightweight with small dimensions so that the circuit arrangement can be used particularly well in spacecraft or the like.

This is accomplished according to the present invention in that the circuit arrangement includes two voltage converters i.e., inverter circuits, which are controlled by pulse width modulated signals at a high frequency with one of the inverter circuits producing the positive half waves and the other inverter circuit producing the negative half waves respectively of the alternating output voltage, the outputs of the voltage inverter circuits are connected in series across a common load and controlled electronic power switches are provided to short-circuit the output of the respective inverter circuit during the time period it is not putting out any energy.

According to one embodiment of the present invention, the two voltage converters or inverter circuits are controlled with rectangular pulse width modulated signals. The frequency of the rectangular signals may lie, for example, between 10 and 100 kHz. This results in a substantial reduction of the weights and dimensions of the devices.

According to a further embodiment of the invention, the rectangular control signals are provided from a comparison of the momentary values of a reference voltage with those of a triangular voltage at the high frequency which has either only positive or only negative amplitude values. According to a further feature of the present invention, therefore, the two voltage converters are controlled by a reference voltage and by a triangular voltage with only positive amplitude values and a triangular voltage with only negative amplitude values. In most cases the reference voltage will be a sine voltage and will correspond in its shape to the desired output voltage. Therefore, for purposes of modulation both the sine voltage and the triangular shaped voltage are fed to a voltage comparator which produces the pulse width modulated rectangular control voltage at its output.

Since this modulation technique is able to convert only reference voltage amplitudes of the same polarity, e.g., positive polarity, as that of the triangular voltage to suitable rectangular signals, a further embodiment of the present invention provides that each of the voltage converters is controlled by the triangular shaped voltage, and the reference voltage or the reference voltage with an inverted polarity (i.e., shifted in phase by 180°), respectively.

According to a further feature of the present invention, the alternating output voltage can be controlled by a comparison of its momentary amplitude values with the momentary values of the reference voltage. This permits regulation not only of the amplitude but also of the shape of the alternating output voltage.

Finally, according to a further feature of the present invention, two or more voltage converter circuits may be operated in parallel.

The primary advantage of the present invention is that true-to-shape half waves of the reference voltage are present at the outputs of the two voltage converters since the pulse widths of the control voltage are varied to correspond to the level of the momentary value of the reference voltage. Thus the output voltage has a minimum of distortion in the curve shape. Further advantages of the invention are its easy controllability, its application over a wide input voltage range, its rigid phase relationship to the reference voltage and the possibility of producing any desired shape of output voltage.

DESCRIPTION OF THE PREFERRED EMBODIMENTS

Figure 1:
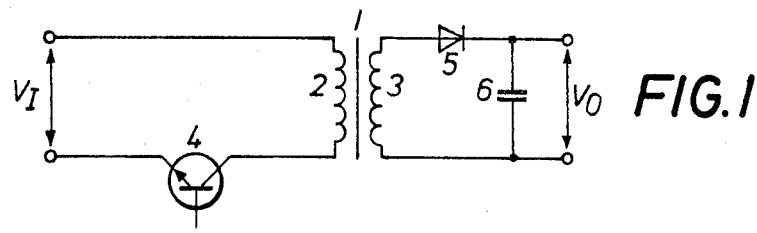
FIG. 1 is a basic block circuit diagram for a d.c. to a.c. voltage converter, i.e., an inverter circuit.

The basic voltage converter or inverter circuit shown in FIG. 1, which can be operated with various input and output voltages over a wide power range between several watts and several hundred watts, includes a transformer 1 having a primary winding 2 and a secondary winding 3. A transistor 4 is connected in the primary circuit of the transformer with its emitter-collector path in series with the primary winding 2. The secondary circuit of the transformer 1 is provided with a diode 5 connected in series with the secondary winding 3, and a capacitor 6 which is connected in parallel with the series connection of the secondary winding 3 and the diode 5. The amplitude of the output voltage $V_o$ of the voltage converter which, due to the direction of windings in the transformer and due to the polarity of the diode 5, operates as a so-called blocking converter, may be lower or higher than the input voltage $V_I$.

The output voltage $V_o$ can be controlled in various ways.

In the intended field of use the control is usually effected by pulse width modulation at the base of the switching transistor 4. In this case, the switching transistor 4 is made conductive for the duration of one pulse width. Thus during every conductive period of the transistor 4 energy, which is proportional to the square of the length of the pulse, is stored in the transformer by means of the primary winding 2 and this energy is transferred from the secondary winding to the circuit output during the nonconductive phase of the switching transistor 4. The energy furnished to the output under ideal conditions is determined by:

$$P_{output} = E \cdot f_s = \tfrac{1}{2} L_1 \cdot I_{1max}^2 \cdot f_s = \tfrac{1}{2} L_2 \cdot I_{2max}^2 \cdot f_s \qquad (1)$$

where
$E$ = the energy transformed during one switching period
$f_s$ = the switching frequency
$L_1$ = the inductance of the primary winding
$L_2$ = the inductance of the secondary winding
$I_{1max}$ = the peak value of the current in the primary winding
$I_{2max}$ = the peak value of the current in the secondary winding. From $$v_I = L_1 \cdot \frac{di_1}{dt} \qquad (2)$$

there results for a constant input voltage $$L_1 \cdot I_{1max} = V_I \cdot t_{an} \qquad (3)$$

where $t_{an}$ is the time during which the switching transistor 4 is conductive.

Solving equation (3) for $I_{1max}$ and inserting the result in equation (1) results in the following equation for the output energy:

$$P = \tfrac{1}{2} V_I^2 \cdot \frac{f_s}{L_1} \cdot t_{an}^2 = \frac{V_o^2}{R_L} \qquad (4)$$

where $R_L$ is equal to the load resistance. Finally, solving equation (4) for the output voltage $V_o$ results in $$V_o = \sqrt{\tfrac{1}{2}} \cdot \sqrt{\frac{f_s \cdot R_L}{L_1}} \cdot V_I \cdot t_{an} \qquad (5)$$

Equation (5) shows that with a constant load $R_L$ the output voltage $V_o$ is proportional to the switched-on time $t_{an}$, i.e., the duration of the conductive state of the switching transistor 4. Thus, the output voltage $V_o$ will be sinusoidal, if for example, the base of transistor 4 is controlled with a control voltage which is modulated with a sine voltage.

Figure 2:
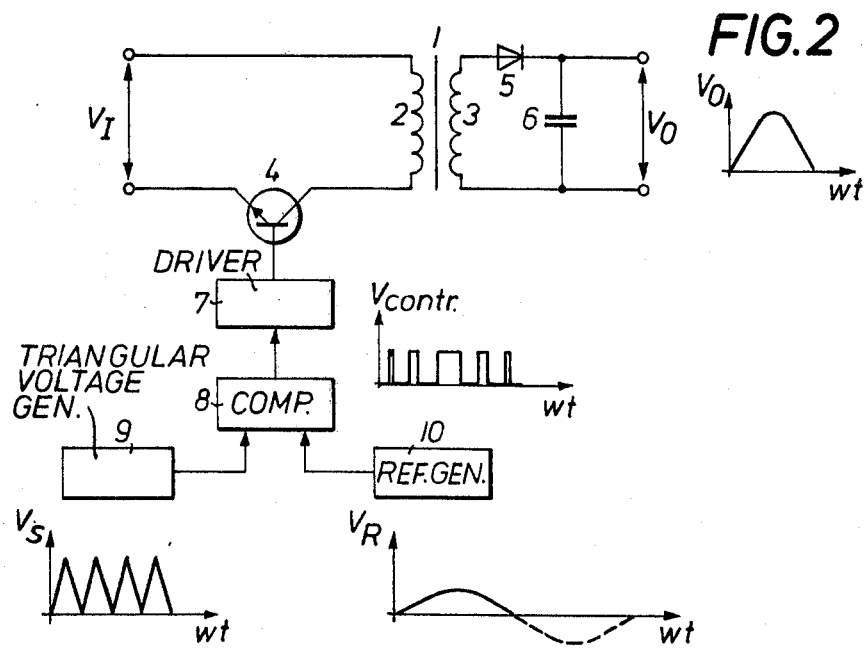
FIG. 2 is a block circuit diagram of an unregulated half sine wave generator.
Figure 3:
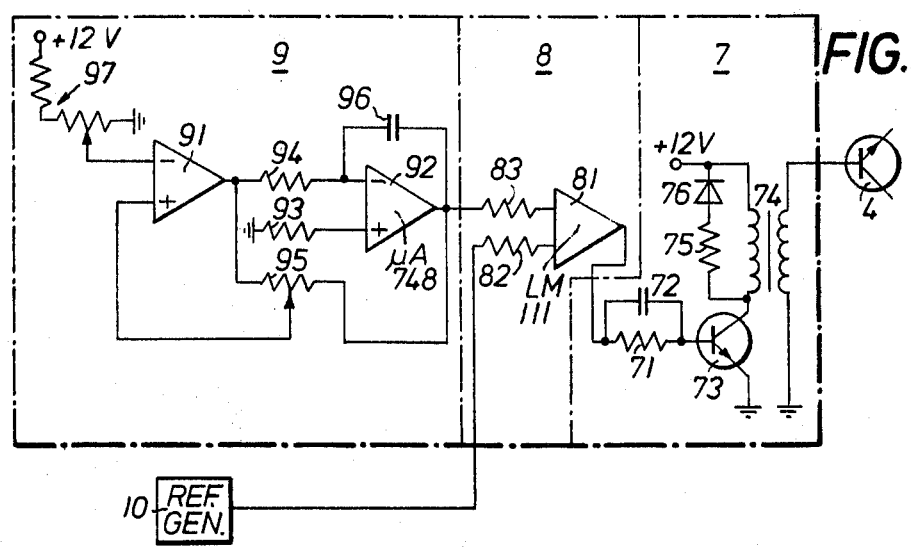
FIG. 3 is a detailed block circuit diagram for the driver stage, the comparator and the triangular voltage generator of FIG. 2.

FIGS. 2 and 3 show how half waves can be produced at the output of the voltage converter shown in FIG. 1. The same reference numerals are used for the voltage converter of the half wave generator shown in FIG. 2 as were used in FIG. 1. The base of switching transistor 4 is connected, via a driver stage 7, to the output of a comparator 8 having two inputs. These two inputs of the comparator 8 are electrically conductively connected with the outputs of voltage generators 9 and 10, respectively. In the illustrated embodiment generator 9 produces a triangular voltage and generator 10 the reference voltage (e.g., a sinusoidal voltage). An example of a specific circuit for the driver stage 7, the comparator 8 and the generator 9 producing the triangular voltage is shown in FIG. 3.

As shown in FIG. 3, the driver stage 7 includes a transistor 73 whose base is controlled via an RC member 71, 72 by the output of comparator 8 which substantially comprises an operational amplifier 81. The emitter-collector path of transistor 73 is connected in series with the primary winding of a transformer 74. This primary winding is connected in parallel with the series connection of a resistor 75 and a stabilizing diode 76 which protect the transistor 73 against excess voltage peaks during the switch-off process. The voltage signal required to control the transistor 4 shown in FIG. 2 is produced at the secondary winding of transformer 74.

The two inputs of the operational amplifier 81 are connected, via respective resistors 82 and 83, to the output of the sine wave generator 10 and to the output of the generator 9 which furnishes the triangular voltage, respectively. The generator 9 includes two series-connected operational amplifiers 91 and 92. One input of the second operational amplifier 92 is grounded via a resistor 93. The other input of operational amplifier 92 is connected via a capacitor 96 to its own output and via a resistor 94 to the output of the first operational amplifier 91. A potentiometer 95 is connected in parallel across resistor 94 and the second operational amplifier 92, i.e., between the outputs of operational amplifiers 91 and 92. The center tap of the potentiometer 95 is connected with one input of the first operational amplifier 91. Potentiometer 95 serves to control the amplitude of the output voltage of comparator 9. The other input of operational amplifier 91 is connected to a voltage divider 97 connected across a source of operating potential.

Figure 4:
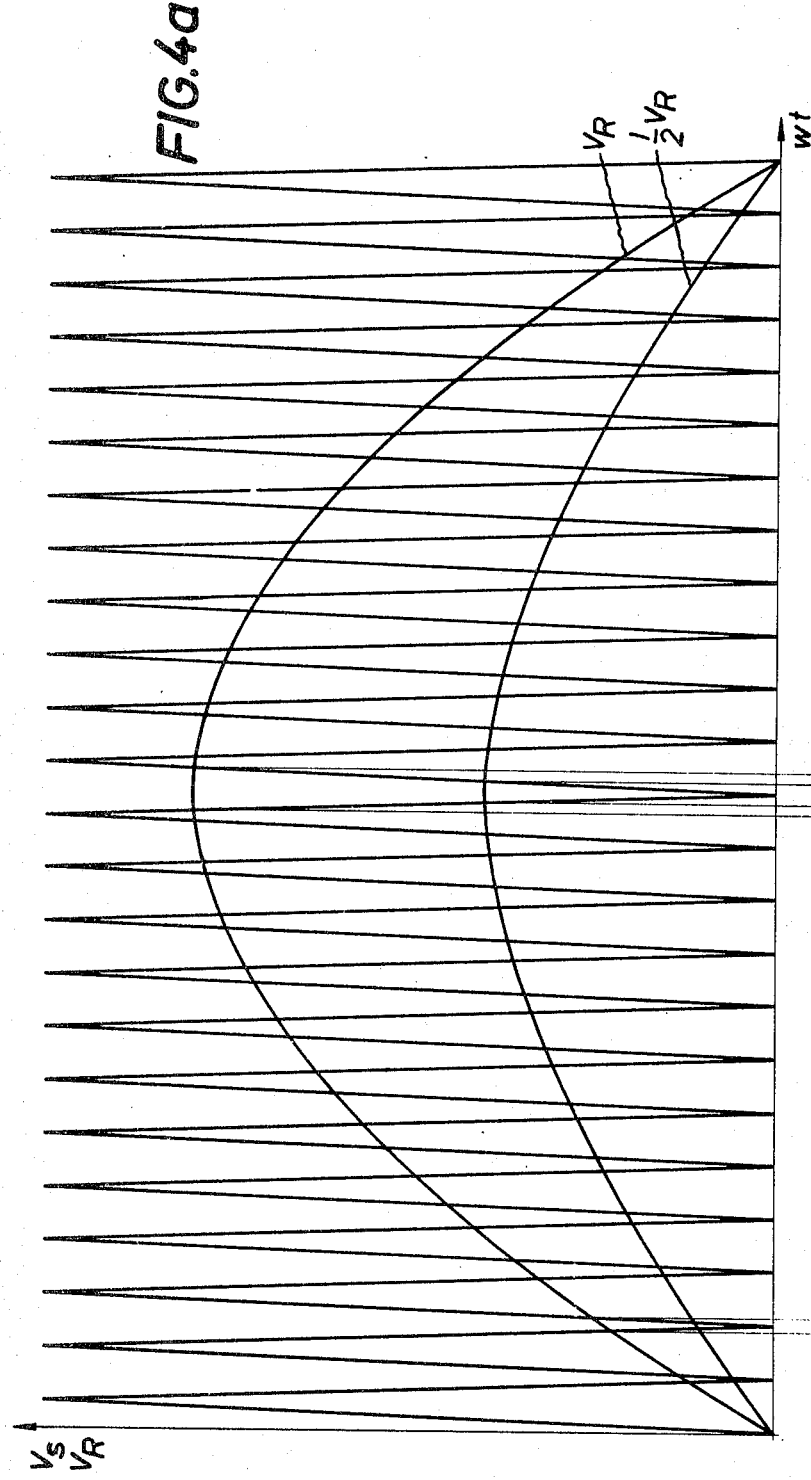
FIGS. 4a and 4b are diagrams illustrating the manner in which the reference and triangular voltages are combined in the comparator of FIG. 2 to provide the pulse width modulated control signal.

In comparator 8, the reference voltage $V_R$ (e.g., 50, 60 or 400 Hz) from generator 10 is continuously compared with the triangular voltage $V_s$, which has the switching frequency $f_s$ (generally 20 kHz to 100 kHz) from generator 9. A comparison of these two voltages produces at the output of the voltage comparator 8 either a voltage signal or no voltage signal depending on whether the reference voltage is higher or lower than the triangular voltage. The rectangular output voltage $V_{contr}$ resulting from the comparison in comparator 8 can be seen in FIGS. 4a and 4b. FIG. 4a graphically shows the reference voltage $V_R$ or ½ $V_R$, respectively, which is here assumed to be sinusoidal, as well as the triangular voltage $V_s$ in dependence on the phase angle. FIG. 4b shows the curve for the output voltage from comparator 8. At the points of intersection of the sinusoidal voltage $V_R$ or ½ $V_R$, respectively, with the triangular voltage $V_s$, there is produced an edge of a rectangular pulse. This is shown for the second and 12th pulse of the output $V_{contr}$ by the lines which connect the two diagrams. The fully drawn rectangular pulses shown in FIG. 4b are produced by a comparison of the voltages $V_R$ and $V_s$, while the dashed rectangular pulses were obtained by a comparison of voltage ½ $V_R$ with voltage $V_s$. FIGS. 4a and 4b clearly show that the pulse widths of the rectangular pulses increase with increasing amplitude of the sinusoidal voltage $V_R$ or ½ $V_R$, respectively.

Referring again to FIG. 2, the rectangular output voltage $V_{contr}$ produced at the output of comparator 8, which voltage corresponds to the rectangular voltage shown in FIG. 4b with different pulse widths, is shown adjacent comparator 8. This rectangular voltage $V_{contr}$ controls the switching transistor 4, via driver stage 7, so that, according to equation (5), at the output of the voltage converter there are produced half waves with momentary values which are proportional to the time period $t_{an}$ or to the respective pulse widths of the rectangular voltage $V_{contr}$. One converter or inverter as shown in FIG. 2 can produce either only positive half waves or only negative half waves since the triangular voltage $V_s$ has only positive amplitudes and comparator 8 does not emit a signal when the amplitudes of the reference voltage $V_R$ are negative. In order to produce the negative amplitudes of the output voltage, a second voltage inverter circuit such as generally shown in FIG. 2 is required. According to the invention, this second inverter circuit has its output, i.e., its secondary winding 3, connected in series with the output of the first inverter circuit and its switching transistor also controlled by pulse width modulated signals.

Figure 5:
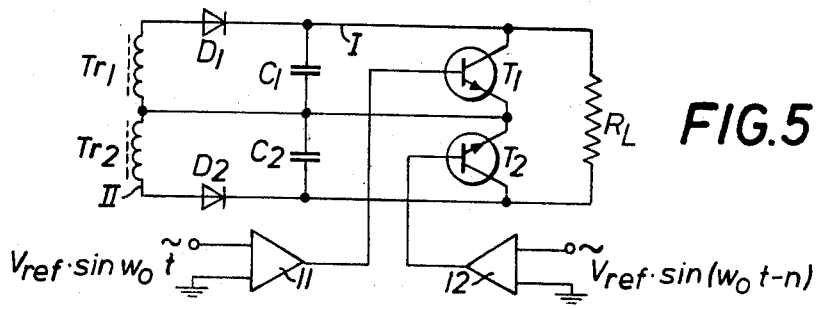
FIGS. 5 and 6 show two different embodiments of only the secondary circuits of two voltage converters as shown in FIGS. 1 or 2 which are interconnected according to the invention.
Figure 6:
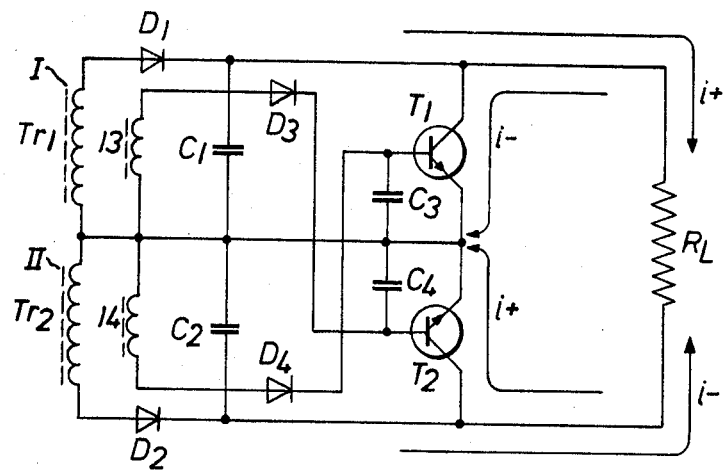

FIGS. 5 and 6 show two different embodiments of only the secondary circuits of two voltage converters or inverters I and II with their outputs connected in series and feeding a common load $R_L$ according to the invention. The primary circuits of the two converters I and II may each be as shown in FIG. 2. In FIGS. 5 and 6, the voltage converter I includes the secondary winding of a transformer $I_{r1}$, a diode $D_1$, a capacitor $C_1$ and a transistor $T_1$, while the voltage converter II has the corresponding components identified with $T_{r2}$, $D_2$, $C_2$ and $T_2$. The transformer secondary windings, the diodes and the capacitor of each of the converters I and II of FIGS. 5 and 6 correspond to the components 3, 5 and 6 respectively of FIG. 2. The transistors $T_1$ and $T_2$ which have their emitter-collector paths connected in parallel with capacitors $C_1$ and $C_2$, respectively, serve as power switches to short-circuit the output of the particular one of the voltage converter I or II for the duration of the half period during which it is putting out any energy. For the current flowing back from load $R_L$, the current path thus becomes conductive by switching in transistor $T_1$ or $T_2$.

According to the embodiment of FIG. 5, transistors $T_1$ and $T_2$ are switched in by two zero voltage detectors 11 and 12 which have their outputs electrically conductively connected to the bases of transistor $T_1$ and $T_2$, respectively. The inputs of the zero voltage detectors 11 and 12 are fed by two sinusoidal reference voltages shifted in phase with respect to one another by 180°. Thus each of the transistors $T_1$ and $T_2$ will be conductive for one half of the period of the reference signal.

In the embodiment shown in FIG. 6, the control voltages for transistors $T_1$ and $T_2$ are furnished by two separate transformer secondary windings 13 and 14 which are associated with the transformers $T_{r1}$ and $T_{r2}$, respectively. Each of the additional secondary windings 13 and 14 has one end connected to the common junction of the series connected output secondary windings of the transformers $T_{r1}$ and $T_{r2}$ and its other end connected via a diode $D_3$ or $D_4$, respectively, and a filter formed by a capacitor $C_4$ or $C_3$, respectively, to the base of the transistor $T_2$ or $T_1$, respectively, which is connected across the output of the other voltage converter. As a result of this arrangement, the alternating voltage of the voltage converter I which has been induced in winding 13 is fed, after rectification by diode $D_3$ and filtering through capacitor $C_4$, to the base of transistor $T_2$ of the second voltage converter II to render $T_2$ conductive and short-circuit the output of converter II. In a similar manner the voltage induced in winding 14 of the voltage converter II is fed, via diode $D_4$ and capacitor $C_3$, to the base of transistor $T_1$ of the voltage converter I. In this embodiment, voltage converter I furnishes the positive half waves of the current ($i+$) while voltage converter II furnishes the negative half waves of the current ($i-$) to the load $R_L$ and the corresponding current direction arrows are shown in FIG. 6. If the voltage converter I puts out energy, the transistor $T_2$ is rendered conductive and the load current return path is completed via transistor $T_2$ of the second voltage converter II. Similarly, the load current return path is completed via transistor $T_1$ of the voltage converter II during the time period the voltage converter II is furnishing the negative half waves of the current ($i-$) to the load $R_L$.

Figure 7:
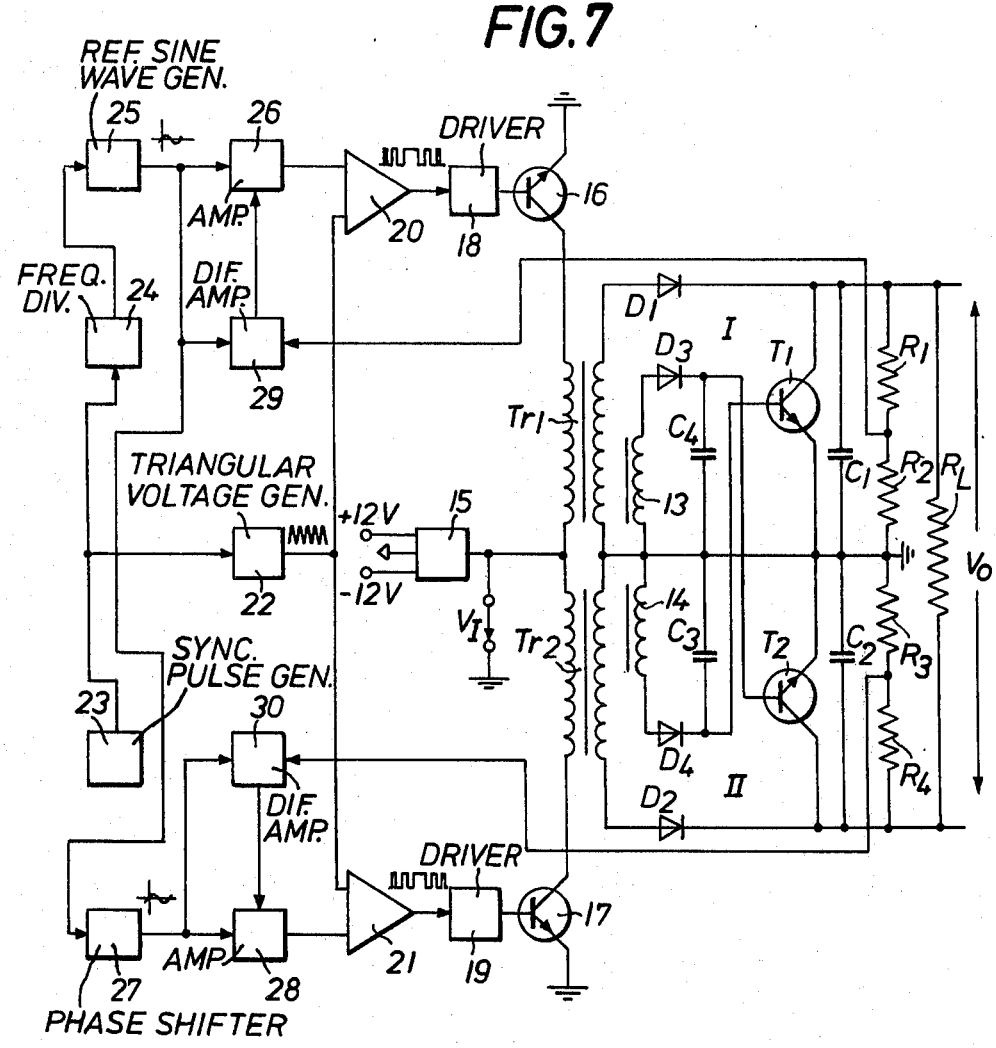
FIG. 7 is a block circuit diagram for a complete circuit arrangement according to the invention with a secondary circuit as shown in FIG. 6.

Turning now to FIG. 7, there is shown a complete circuit arrangement for producing an alternating voltage employing two voltage converters connected according to the invention. The secondary circuits of the voltage converters are connected as shown in the embodiment of FIG. 6 and the same reference numerals are used for the individual components. The primary inductances of the transformers $T_{r1}$ and $T_{r2}$ of the voltage converters I and II are fed by the input voltage $V_I$. This input voltage $V_I$ also supplies the auxiliary source 15 for the control logic (not shown) which source includes a push-pull direct voltage converter. The input voltage of the control logic is thus kept constant by the series controller to obtain a constant output voltage of, for example, ± 12 V.

The switching transistors 16 and 17, which are connected in series with the primary winding of the transformers $T_{r1}$ and $T_{r2}$ respectively and correspond to the transistor 4 of FIG. 2, are each controlled, via a driver stage 18 or 19, respectively, by the output signal from a comparator 20 or 21, respectively. One input of each comparator 20 and 21 is electrically conductively connected with the output of a triangular voltage generator 22 which is synchronized by a pulse generator 23. The pulse generator 23, for which an astable multivibrator can be used, can simultaneously control a reference sine wave generator 25 via a suitable frequency divider 24. The output of reference sine wave generator 25 is fed, via a voltage amplifier 26, e.g., a field effect transistor, to the second input of comparator 20 and, via a voltage polarity inverter or reversing circuit 27, e.g., a 180° phase shifter, and a voltage amplifier 28, to the second input of comparator 21. The components shown in FIG. 3 may be used, for example, for the driver stages 18 and 19, the triangular voltage generator 22 and the comparators 20 and 21.

According to the embodiment of the invention shown in FIG. 7, the alternating output voltage $V_o$ at load $R_L$ can be controlled by a comparison of the momentary values of the alternating output voltage $V_o$ and of the reference voltage produced by generator 25. For this purpose, a voltage divider network is connected in parallel with load $R_L$. The voltage divider network includes a first voltage divider formed of two resistors $R_1$ and $R_2$ connected across the output of voltage converter I and a second voltage divider formed of two resistors $R_3$ and $R_4$ connected across the output of converter II. The center tap of the voltage divider ($R_1$, $R_2$) belonging to voltage converter I is electrically conductively connected with one input of a differential amplifier 29, the second input of which is electrically conductively connected with the output of the reference sine wave generator 25 and the output of the differential amplifier 29 is electrically conductively connected with the control input of the amplifier 26 which is a voltage controlled amplifier. In a corresponding manner the center tap of voltage divider ($R_3$, $R_4$) associated with voltage converter II is connected to a differential amplifier 30 which receives a further input signal from phase shifter 27 and furnishes its output signal to the control input of the voltage controlled amplifier 28. At the load $R_L$ there thus appears a sinusoidal supply voltage $V_o$ whose amplitude is constant for a given input voltage $V_I$.

Figure 8:
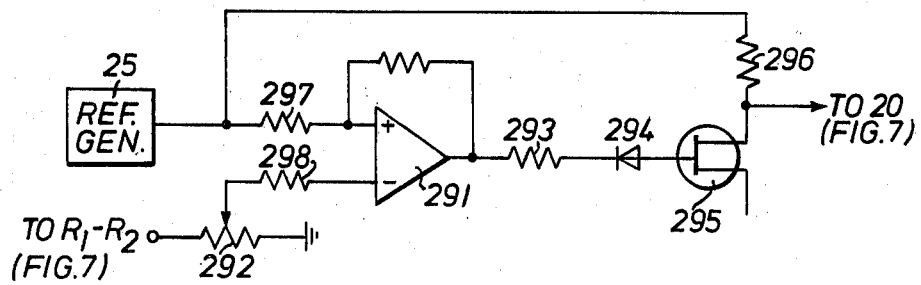
FIG. 8 is a block circuit diagram for a differential amplifier used in the embodiment of FIG. 7.

FIG. 8 shows one embodiment of a circuit for the differential amplifier 29, which performs a rated value-actual value comparison, and its connection to the amplifier 26. It is to be understood that a similar circuit arrangement may be used for the amplifiers 30 and 28. The differential amplifier 29 includes an operational amplifier 291, having a first input connected, via a resistor 297, to the output of the reference sine voltage generator 25 and its second input electrically conductively connected, via a resistor 298 and a potentiometer 292, with the center tap of the voltage divider $R_1$, $R_2$. The output of operational amplifier 291 is connected, via a resistor 293 and a diode 294 connected in the reverse direction, to the gate electrode of a field effect transistor 295 the drain terminal of which is connected to one input of comparator 20 of FIG. 7, and, via a resistor 296, to the first input of operational amplifier 291. The field effect transistor 295 practically constitutes the voltage amplifier 26 of FIG. 7.

Generally it is desired to operate voltage converters in parallel. The absolute prerequisites for such operation are: identical conditions at all outputs, e.g., the same amplitudes, the same frequency and the same phase. The better this requirement can be met, the more efficient is the operation and the energy distribution between the voltage converters. Since the output voltage produced with the aid of the circuit arrangement of the present invention is not subjected to a change in phase with respect to the reference sine voltage, all circuits controlled by this reference voltage have the same phase conditions for any load at their outputs. The greatest advantage of the proposed circuit arrangement in parallel operation relates to the constant energy characteristic of the voltage converters in the regulated state. Independent of the load, every voltage converter furnishes constant energy at a given input voltage and pulse width of the switching signal. If two or more voltage converter arrangements operate in parallel, only one reference voltage source, one amplifier and one control circuit are required to control all of the parallel units. Every voltage converter contributes its energy to the desired total energy which is determined by the inductances of the primary windings of the switching transformers and by the pulse width of the control signals.

Figure 9:
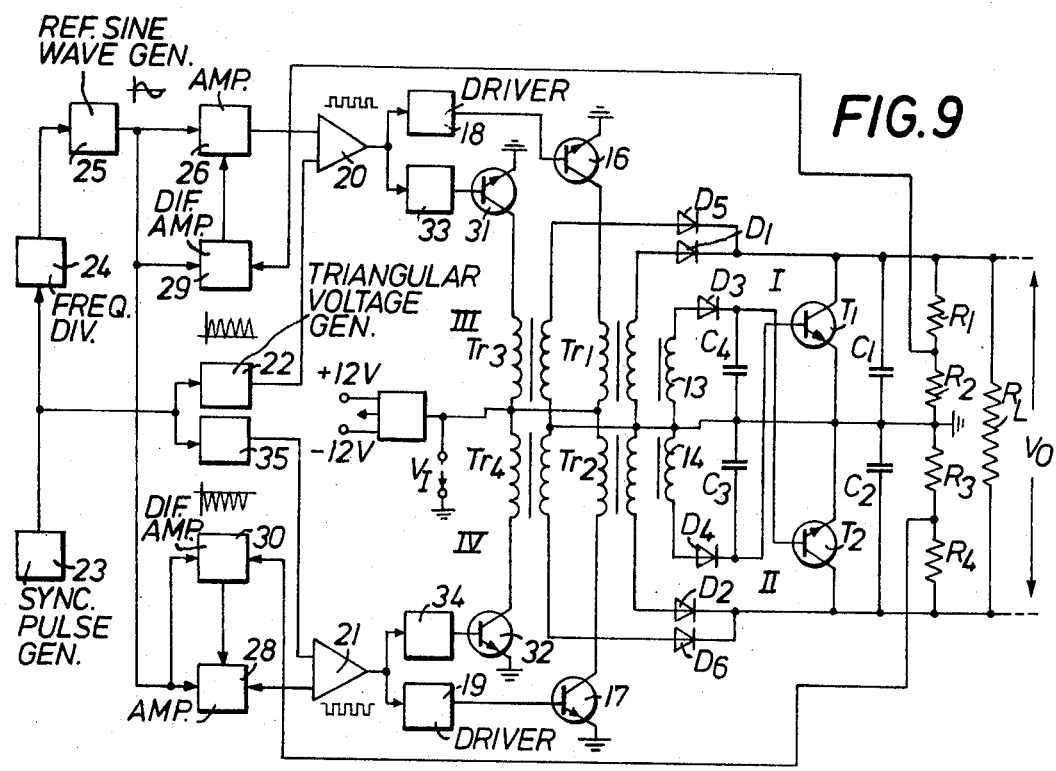
FIG. 9 is a block circuit diagram for a complete circuit arrangement according to the invention, which uses four voltage converters.

FIG. 9 shows a circuit arrangement for producing an alternating voltage; this arrangement uses four voltage converters I, II, III and IV. The circuit arrangement shows practically a parallel operation of four voltage converters. For the voltage converters I and II as well as for the other individual components reference numerals shown in FIG. 7 were used as far as the respective individual components are in conformity. The voltage converters III and IV consist of the transformers $T_{r3}$ or $T_{r4}$, respectively, the switching transistors 31 or 32, respectively and the diodes $D_5$ or $D_6$, respectively. The parallel operation shown with four voltage converters requires no additional separate transformer secondary windings, as shown for example in FIG. 7 and designated as 13 and 14, for the transformers $T_{r3}$ and $T_{r4}$ because the circuit of FIG. 9 likewise requires only two electronic power switches $T_1$ and $T_2$. It is to be ensured that all transformers used are rated such that the same respective mean current flows through the diodes $D_1$ and $D_5$ or $D_2$ and $D_6$, respectively.

The control of the transistors 16 and 31 or 17 and 32, respectively is accomplished with sinusoidal alternating reference voltage and a triangular voltage with positive amplitude values only or a triangular voltage with negative amplitude values only, respectively. For this purpose, in contrast to the example shown in FIG. 7, no reversing circuit 27 is required but, in addition to the triangular voltage regulator 22 for the positive amplitude values, a further triangular voltage generator 35 for the negative amplitude values is necessary. The output of the triangular voltage generator 22 is electrically conductively connected with an input of the comparator 20, whereas the output of the triangular voltage generator 35 is connected to an input of the comparator 21. The outputs of the comparators 20 and 21 are connected via driver stages 18 and 33 or 19 and 34, respectively to the control inputs of the transistors 16 and 31 or 17 and 32, respectively.

It will be understood that the above description of the present invention is susceptible to various modifications, changes and adaptations, and the same are intended to be comprehended within the meaning and range of equivalents of the appended claims.

What is claimed is:

1. A circuit arrangement for producing an alternating output voltage from a d.c. input voltage comprising: means for providing pulse width modulated signals at a high frequency; first and second voltage inverter circuit means, each controlled by said pulse width modulated signals at a high frequency, for producing the positive half waves of the alternating output voltage and the negative half waves of the output voltage respectively from a d.c. input signal; means for connecting the outputs of said first and second voltage inverter circuit means in series across a common load; first and second electronic power switches connected across the outputs of said first and second voltage inverter circuit means respectively; and means for controlling said power switches to short-circuit the output of the respective first and second voltage inverter circuit means during the time it is not producing output energy.

2. A circuit arrangement as defined in claim 1 wherein said means for providing pulse width modulated signals provides pulse width modulated rectangular signals.

3. A circuit arrangement as defined in claim 2 wherein said means for providing pulse width modulated rectangular signals includes a first signal generator means for producing an alternating reference voltage; a second signal generator means for producing a triangular voltage having a higher frequency than said reference voltage and having amplitudes of only one polarity; and comparison circuit means for comparing the momentary amplitude values of said reference voltage and said triangular voltage to produce said pulse width modulated rectangular signals.

4. A circuit arrangement as defined in claim 2 wherein said means for providing pulse width modulated rectangular signals includes: a first signal generator means for producing an alternating reference voltage; a second signal generator means for producing a triangular voltage having a higher frequency than said reference voltage and amplitude values of only one polarity; a first comparison circuit means, having its output connected to said first inverter circuit means, for comparing the momentary amplitude values of the output signals from said first and second signal generator means to produce a pulse width modulated rectangular output signal for controlling said first inverter circuit means; a third signal generator means for producing a triangular voltage of said higher frequency and having amplitude values of only the opposite polarity; and second comparison circuit means, having its output connected to said second inverter circuit means, for comparing the momentary amplitude values of the output signals from said first and third signal generator means to produce a pulse width modulated rectangular output signal for controlling said second inverter circuit means.

5. A circuit arrangement as defined in claim 2 wherein said means for providing pulse width modulated rectangular signals includes: a first signal generator means for producing an alternating reference voltage; a second signal generator means for producing a triangular voltage having a higher frequency than said reference voltage and amplitude values of only one polarity; a first comparison circuit means, having its output connected to said first inverter circuit means, for comparing the momentary amplitude values of the output signals from said first and second signal generator means to produce a pulse width modulated rectangular signal for controlling said first inverter circuit means; a polarity reversing circuit having its input connected to the output of said first signal generating means; and a second comparison circuit means, having its output connected to said second inverter circuit means, for comparing the momentary amplitude values of the output signals from said polarity reversing circuit and said second signal generating means to produce a pulse width modulated rectangular signal for controlling said second inverter circuit means.

6. A circuit arrangement as defined in claim 1 wherein said means for providing pulse width modulated signals includes an alternating reference voltage generator and means for converting the momentary amplitudes of said reference voltage to said pulse width modulated signals; and further comprising means for regulating the alternating output voltage of said circuit arrangement including means for comparing the momentary amplitude values of said alternating output voltage and said reference voltage to provide an output signal for controlling said reference voltage.

7. A circuit including a plurality of circuit arrangements as defined in claim 1 connected in parallel.

8. A circuit arrangement as defined in claim 1 wherein each of said first and second voltage inverter circuit means includes a transformer having a primary and a secondary winding, a transistor having its emitter-collector path in series with said primary winding and its base connected to the output of said means for providing pulse width modulated signals, a diode connected in series with said secondary winding and said common load, and a capacitor connected in parallel with the series connection of said secondary winding and said diode; wherein said secondary windings are connected in series; and wherein each of said first and second power switches is connected in parallel with said capacitor of a respective one of said first and second voltage inverter circuit means.

9. A circuit arrangement as defined in claim 8 wherein each of said first and second power switches is a transistor having its emitter-collector path connected in parallel with the associated said capacitor and its base connected to the output of said means for controlling said power switches.

10. A circuit arrangement as defined in claim 9 wherein said means for controlling said power switches includes: a respective further secondary winding for each of said transformers, said further secondary winding of each of said transformers having one end connected to the common junction of said series connected secondary windings and its other end connected via a diode to the base of the one of said transistors whose emitter-collector path is connected in parallel with the capacitor associated with the other of said transformers.

* * * * *